United States Patent [19]

Wonderling

[11] 4,141,128

[45] Feb. 27, 1979

[54] FILTER BAG CAGE

[75] Inventor: Harold J. Wonderling, Wellsville, N.Y.

[73] Assignee: The Air Preheater Company, Inc., Wellsville, N.Y.

[21] Appl. No.: 869,722

[22] Filed: Jan. 16, 1978

[51] Int. Cl.² ............................................. B23P 15/16
[52] U.S. Cl. .................................. 29/163.5 F; 55/379
[58] Field of Search ...................... 29/163.5 F; 55/302, 55/379; 210/232; 140/89

[56] References Cited

U.S. PATENT DOCUMENTS

| | | | |
|---|---|---|---|
| 1,124,574 | 1/1915 | Zimmer | 55/379 X |
| 3,007,238 | 11/1961 | Pall | 29/163.5 F |
| 3,286,838 | 11/1966 | Jones | 210/232 X |
| 3,386,587 | 6/1968 | Mast et al. | 29/163.5 F |
| 3,394,532 | 7/1968 | Oetiker | 55/302 |
| 3,499,268 | 3/1970 | Pausch | 55/302 |
| 3,733,784 | 5/1973 | Anderson et al. | 55/379 |

FOREIGN PATENT DOCUMENTS

| | | | |
|---|---|---|---|
| 53617 | 6/1946 | France | 55/379 |
| 526327 | 9/1972 | Switzerland | 55/379 |

Primary Examiner—C. W. Lanham
Assistant Examiner—D. M. Gurley
Attorney, Agent, or Firm—Wayne H. Lang

[57] ABSTRACT

A filter that is used to remove dust or other particulate matter from a carrier gas being directed therethrough. The filter comprises a cylindrical bag supported on a skeletal cage that may be shipped in an unassembled form and expanded to final configuration only when prepared for use. The arrangement permits shipping and storing the filter bag in a "knock-down" form that occupies but a small fraction of its final volume, while it may be readily assembled and held permanently rigid by an integral tension spring.

6 Claims, 2 Drawing Figures

FILTER BAG CAGE

BACKGROUND OF THE INVENTION

1. Field of the Invention

This invention relates to bag filter apparatus that is adapted to receive gas carrying a quantity of dust or other particulate matter whereby the dust is retained by the filter apparatus and only dust-free gas is permitted to pass therethrough. A complete apparatus usually comprises an assembly having a plurality of gas pervious filter bags that are supported by an apertured tube sheet and mounted directly on the outer surface of a cylindrical wire frame or "cage" of transverse circular bands and longitudinal rods welded thereto at their points of contact. Inasmuch as a complete bag filter assembly may incorporate a total of from 100 to 200 filter bags with each one having an average length of from 10 to 15 feet, it is readily apparent that the total volume of all assembled units of a bag filter is large and it incorporates many units having a high volume/weight ratio whose shipping and storage costs are excessive. Moreover, the welding of all bag supports is a time-consuming, expensive project that contributes to excessive manufacturing, shipping, storing and assembling costs.

2. Description of the Prior Art

Various patents have been granted to the particular manner of supporting a cylindrical support frame or cage for a tubular shaped bag filter. Representative of these patents is U.S. Pat. No. 3,538,687 of Pausch granted on Nov. 10, 1970, in which a spiral support member is bonded to a series of longitudinal rods as by "welding" to provide a stable bag support. A similar U.S. Pat. No. 3,016,984 granted Jan. 16, 1962, shows a skeletal inner housing member of transverse rings and longitudinal rods bonded thereto to form a cage over which a filter bag is stretched to provide a filter bag assembly of given configuration.

In all instances known, the skeletal support or cage comprises a plurality of lateral rings or supports having a number of longitudinal stringers connected thereto at their points of contact.

SUMMARY OF THE INVENTION

It has been discovered that manufacturing filter bag support members by a process involving welding together wire supports at their points of contact is a slow and expensive operation. Moreover, because of their substantial volume, the manufactured bag support members or cages require excessive space to store and are thus difficult to transport. Consequently, although the total weight of the bag support members is relatively low, the total volume of these members is relatively high so the costs of manufacturing, storing and shipping these support members remain high.

Therefore, it is a primary object of this invention to provide a skeletal cage support for a bag filter which is simple to manufacture and may be completely assembled, without welding, at the point of use. Moreover, the process of the invention permits the elements of the skeletal cage support to be easily shipped in a contracted condition that occupies but a fractional portion of the volume required by a completely assembled unit, thereby providing a substantial reduction in cost for storing, shipping and assembling a bag filter unit.

DESCRIPTION OF THE PREFERRED EMBODIMENT

Figure 1:
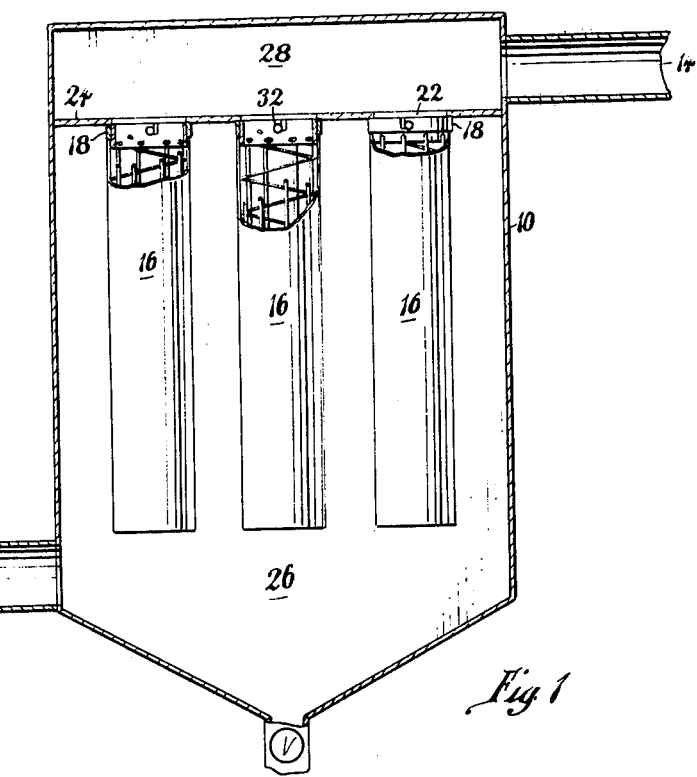
FIG. 1 is a vertical section of a filter apparatus constructed in accordance with the present invention.
Figure 2:
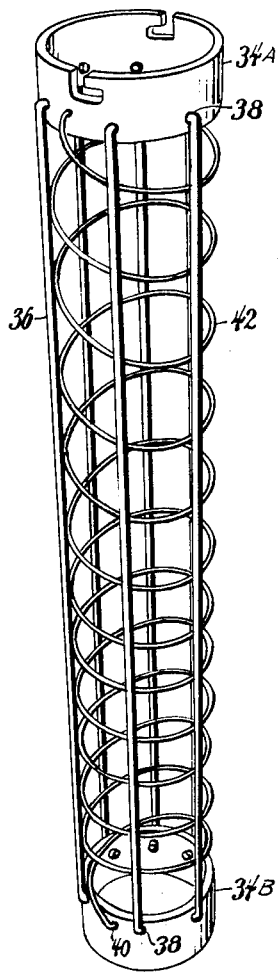
FIG. 2 is an enlarged drawing that shows the details of construction of a single bag filter support.

A housing 10 is formed with an inlet 12 for dirty gas and an outlet 14 for gas which has been cleaned from particulate matter by passing it through minute openings or pores of a filter bag 16 which is disposed therebetween. The filter bag depends from a collar 18 around each opening 22 of a tube sheet 24 that extends across the housing and divides the housing into an inlet chamber 26 for dirty gas and an outlet chamber 28 for clean gas as it flows to outlet 14.

The collar 18 includes two or more circumferentially spaced pins 32 that are bonded thereto and extend radially inward into the "L" shaped cutouts of the upper thimble 34A in bayonet-type interlocking relationship. A lower thimble 34B may then be axially aligned with the upper thimble by rigid stringer rods 36 whose ends thereof are bent normal thereto and inserted radially through aligned openings 38 in the spaced thimbles 34A and 34B. To keep the ends of rods 36 tightly held within the openings 38 of the spaced thimble members, the thimble members are continuously biased together by a relatively lightweight tension spring 42 whose opposite ends are connected to the thimble members or otherwise bent to extend radially through openings 40 in the spaced thimble members. The spiral spring which pulls the thimbles 34A and 34B together is preferably positioned inside the longitudinal stringer rods 36 whereby the filter bag 44 may closely abut the outer surface of the longitudinal rods 36.

The diameter of tension spring 42 in contracted form slightly exceeds the diameter of the adjacent thimble members. However when drawn to an extended position the diameter of the spring is reduced to less than that of the timble members whereby said spring will tightly embrace the outer surface thereof to produce a force which acts radially inward against the periphery of the thimble.

An actual assembly procedure would first require that an upper thimble 34A be axially aligned with the lower thimble 34B. Opposite ends of spring member 42 would then be inserted through openings in the upper and lower thimble members and the thimble members 34A and 34B, then spaced apart a distance whereby the bent ends of stringer rods 36 might be readily inserted through aligned openings of the thimble members to hold them in their space relation.

After several elongate rods 36 have been inserted through aligned openings in the spaced thimble members, the filter cage assumes a stable form that will provide a rigid support for the filter bag. Consequently, there is provided a support cage or base for a bag filter that may be shipped in a disassembled form to occupy a minimum space, but upon arrival at its point of use may be quickly assembled, without welding, into a rigid support cage for a bag filter.

I claim:

1. The method of manufacturing an elongate cage type support for a tubular filter bag comprising the steps of axially aligning a pair of annular thimble members wherein each is provided with a plurality of apertures that extend radially therethrough, positioning a contracted tension spring intermediate said thimble members, linking each end of the tension spring to a thimble member lying adjacent thereto, spacing the thimble members apart to extend the tension spring therebetween, positioning a plurality of elongate ribs longitudinally between aligned apertures in the spaced thimble members to hold said thimble members apart while they are biased continuously by the extended coil spring, and placing a fabric filter member over the elongate cage to provide a rigid filter element between spaced thimble members.

2. The method of manufacturing a filter element as defined in claim 1 including the step of utilizing a coil spring member whose coil diameter in contracted form exceeds the diameter of the thimble members attached thereto.

3. The method of manufacturing a filter element as defined in claim 2 including the step of utilizing a coil spring member having a diameter less than that of a thimble member when said coil spring is in an extended condition.

4. The method of manufacturing a filter element as defined in claim 3 including the step of bending the ends of said longitudinal ribs substantially perpendicular to the longitudinal axis thereof before they are inserted through aligned apertures of the thimbles.

5. The method of manufacturing a filter element as defined in claim 4 including the step of positioning the longitudinal ribs outside the perimeter of the tension spring for the fabric filter member.

6. The method of manufacturing a filter element as defined in claim 5 including the step bending ends of the coil spring radially inward to link in aligned openings of said thimble means whereby elongation of said coil spring reduces the diameter of said coil and produces a force which acts radially inward against the periphery of the thimble.

* * * * *